(12) United States Patent
Oh et al.

(10) Patent No.: US 7,573,447 B2
(45) Date of Patent: Aug. 11, 2009

(54) APPARATUS AND METHOD FOR DRIVING LIQUID CRYSTAL DISPLAY DEVICE

(75) Inventors: Eui Yeol Oh, Yongin-si (KR); Hee Jung Hong, Seoul (KR); Hong Chul Kim, Ansan-si (KR); Hee Jeong Park, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 612 days.

(21) Appl. No.: 11/138,377

(22) Filed: May 27, 2005

(65) Prior Publication Data

US 2006/0007103 A1    Jan. 12, 2006

(30) Foreign Application Priority Data

May 28, 2004    (KR) .................... 10-2004-0038420

(51) Int. Cl.
G09G 3/36    (2006.01)
(52) U.S. Cl. .......................................... 345/87; 345/82
(58) Field of Classification Search ................. 345/102, 345/589, 876, 690, 207, 87–100, 211, 204; 359/51, 53; 315/158; 340/784, 815.45; 349/61, 349/64, 114, 25, 35; 250/552; 39/44
See application file for complete search history.

(56) References Cited

U.S. PATENT DOCUMENTS

| | | | |
|---|---|---|---|
| 6,507,159 B2 | 1/2003 | Muthu | |
| 6,525,683 B1 * | 2/2003 | Gu | 341/140 |
| 6,791,513 B2 * | 9/2004 | Ogino et al. | 345/55 |
| 6,831,621 B2 * | 12/2004 | Nakano | 345/87 |
| 6,867,757 B1 | 3/2005 | Nakamura | |
| 6,870,525 B2 * | 3/2005 | Kawabata et al. | 345/102 |
| 7,109,957 B2 * | 9/2006 | Yang | 345/82 |
| 7,274,346 B2 * | 9/2007 | Cok et al. | 345/82 |
| 2001/0046131 A1 | 11/2001 | Hoelen et al. | |
| 2002/0135553 A1 | 9/2002 | Nagai et al. | |
| 2003/0117595 A1 | 6/2003 | Li et al. | |
| 2005/0052388 A1 * | 3/2005 | Handschy et al. | 345/89 |

FOREIGN PATENT DOCUMENTS

| | | |
|---|---|---|
| CN | 1265506 A | 9/2000 |
| CN | 1383498 A | 12/2002 |
| CN | 1400488 A | 3/2003 |
| JP | 1-158417 A | 6/1989 |
| JP | 2002-99250 A | 4/2002 |
| JP | 2003-330424 A | 11/2003 |
| JP | 2004-62134 A | 2/2004 |
| JP | 2004-85961 A | 3/2004 |
| JP | 2004-191490 A | 7/2004 |
| JP | 2005-70690 A | 3/2005 |
| JP | 2005-156785 A | 6/2005 |
| JP | 2005-258403 A | 9/2005 |

* cited by examiner

*Primary Examiner*—Nitin Patel
(74) *Attorney, Agent, or Firm*—Birch, Stewart, Kolasch & Birch, LLP

(57) ABSTRACT

An apparatus and method for driving a light source of a liquid crystal display device are provided. The apparatus includes a liquid crystal display panel, a backlight unit including a plurality of light emitting diodes (LEDs) to irradiating light to the liquid crystal display panel, and a driver to selectively drive the LEDs and selectively control a brightness of light generated by the LEDs.

16 Claims, 9 Drawing Sheets

APPARATUS AND METHOD FOR DRIVING LIQUID CRYSTAL DISPLAY DEVICE

This application claims the benefit of Korean Patent Application No. 10-2004-0038420 filed in Republic of Korea on May 28, 2004, which is hereby incorporated by reference.

BACKGROUND OF THE INVENTION

1. Field of the Invention

The present invention relates to an apparatus and a method for driving a liquid crystal display device, and more particularly, to an apparatus and a method for driving a lamp of a liquid crystal display device that is capable of controlling a partial brightness and a color character.

2. Description of the Related Art

In general, a liquid crystal display (hereinafter, LCD) has a trend that its application scope has been gradually widened due to its lightness, its thinness, and its low power consumption. In accordance with such a trend, the LCD is used in an office automation device, an audio/video device and the like. The LCD adjusts the transmittance quantity of a light beam in accordance with an image signal applied to a matrix of a plurality of control switches to thereby display desired pictures on a screen.

Since the LCD is not a spontaneous light-emitting display device, the LCD device needs a backlight unit as a light source. There are two types of the backlight unit for the LCD, i.e., a direct-below type and a light guide plate type. In the direct-below type, several lamps are arranged in the plane. And, a diffusion panel is installed between the lamps and the liquid crystal display panel to fixedly keep the distance between the liquid crystal display panel and the lamps. In the light guide plate type, a lamp is installed in the outer part of the flat panel, and the light from the lamp is incident on the entire surface of the liquid crystal display panel by using a transparent light guide plate.

Referring to FIGS. 1 and 2, the LCD adopting the related art direct-below type backlight includes a liquid crystal display panel 2 to display a picture, and a direct-below type backlight unit to irradiate a uniform light onto the liquid crystal display panel 2.

In the liquid crystal display panel 2, liquid crystal cells are arranged between an upper substrate and a lower substrate in such a manner of an active matrix type, and a common electrode and pixel electrodes to apply an electric field to each of the liquid crystal cells are provided. Generally, the pixel electrode is formed on the lower substrate, i.e., a thin film transistor substrate, for each liquid crystal cell. On the other hand, the common electrode is formed to be integrated with the front surface of the upper substrate. Each of the pixel electrodes is connected to a thin film transistor that is used as a switching device. The pixel electrode drives the liquid crystal cell along with the common electrode in accordance with a data signal supplied through the thin film transistor, thereby displaying a picture corresponding to a video signal.

The direct-below type backlight unit includes a plurality of lamps 36 to generate light, a lamp housing (or a lamp holding container of the direct-below type backlight unit) 34 located at the lower part of the lamps 36, a diffusion plate 12 covering the lamp housing 34, and optical sheets 10 located on the diffusion plate 12.

Each of the lamps 36 includes a glass tube, an inert gas in the inside of the glass tube, and a cathode and an anode installed at both ends of the glass tube. The inside of the glass tube is charged with the inert gas, and the phosphorus is spread over the inner wall of the glass tube.

In each of the lamps 36, if an AC waveform of high voltage is applied to a high voltage electrode and a low voltage electrode from an inverter (not shown), electrons are emitted from the low voltage electrode L to collide with the inert gas in the glass tube, thus the amount of electrons is increased in geometrical progression. The increased electrons cause electric current to flow in the inside of the glass tube, so that the inert gas is excited by the electrons to emit ultraviolet ray. The ultraviolet ray collides with a luminous phosphorus spread over the inner wall of the glass tube to emit visible ray. At this moment, the AC waveform of high voltage is continuously supplied to the lamps 36 so that the lamps are always turned on.

In this way, the lamps 36 are arranged in parallel in the lamp housing 34.

The lamp housing 34 prevents the light leakage of the visible ray emitted from each of the lamps 36 and reflects the visible ray, progressing to the side surface and the rear surface of the lamps 36, to the front surface, i.e., toward the diffusion plate 12, thereby improving the efficiency of the light generated at the lamps 36.

The diffusion plate 12 enables the light emitted from the lamps 36 to progress toward the liquid crystal display panel 2 and to be incident at an angle of a wide range. The diffusion plate 12 is a light diffusion member that is coated on both sides of the film which is composed of transparent resin.

The optical sheets 10 narrow the viewing angle of the light coming out of the diffusion plate 12, thus it is possible that the front brightness of the liquid crystal display device is improved and its power consumption is reduced.

A reflection sheet 14 is arranged between the lamps 36 and the bottom area of the lamp housing 34 to reflect the light generated from the lamps 36 so as to irradiate it in the direction of the liquid crystal display panel 2, thereby improving the efficiency of light.

In this way, the related art LCD generates a uniform light by use of the lamps 36 arranged in the lamp housing 34 to irradiate it to the liquid crystal display panel 2, thereby displaying the desired picture. However, the related art LCD has disadvantages in that it needs to have the lamps turned on continuously, whereby its power consumption is large and a partial peak brightness cannot be realized. The peak brightness is a brightness that occurs when a designated part on the liquid crystal display panel 2 is operated to be instantly brightened in order to display a picture like an explosion or a flash on the liquid crystal display panel 2.

SUMMARY OF THE INVENTION

Accordingly, it is an object of the present invention to provide an apparatus and a method for driving a light source or an LED of a liquid crystal display device that is capable of controlling a partial brightness and a color character.

It is another object of the present invention to provide an apparatus and method for driving a light source of a display device that overcome the limitations and disadvantages associated with the related art.

In order to achieve these and other objects of the invention, an apparatus for driving a liquid crystal display device according to an embodiment of the present invention includes: a liquid crystal display panel to realize a picture for at least two division areas by using a liquid crystal cell of a matrix type; a light generator including at least one light emitting diode and irradiating light to each division area of the liquid crystal display panel; and a light source driver to control a brightness of the light emitting diode, irradiating the light to the each division area, in accordance with a peak value of gray level of each division area.

According to an aspect of the invention, the light generator includes any one of: a first light generator having a white light emitting diode; and a second light generator having red, green, and blue diode. The second light generator includes any one of red-green-blue light emitting diode, red-green-green-blue light emitting diode, and red-green-blue-blue light emitting diode, which are arranged vertically and horizontally.

According to an aspect of the invention, the driver: fixes a duty ratio of a signal being supplied to the light emitting diode in accordance with a reference brightness of the liquid crystal display panel during a scanning period before a picture implementing period of the liquid crystal display panel and changes an amplitude of the signal to correspond to the reference brightness, or fixes the amplitude of the signal being supplied to the light emitting diode in accordance with the reference brightness of the liquid crystal display panel and changes the duty ratio of the signal to correspond to the reference brightness.

The apparatus further includes a timing controller supplied with the peak value of the gray level of each division area to generate a control signal corresponded to the peak value of each gray level to supply it to the driver.

According to an aspect of the invention, the driver includes: a pulse width modulation PWM controller arranged between the timing controller and the light emitting diode; and a switch arranged between the pulse width modulation controller and the light emitting diode to control on-off of the light emitting diode. The PWM controller is connected to a light emitting diode group formed by at least one, in parallel, to adjust a strength of current generated from the timing controller.

A method for driving a liquid crystal display device according to an embodiment of the present invention includes: irradiating light to each designated area of a liquid crystal display panel; generating a control signal corresponding to a peak value of a gray level of each image pixel generated in each designated area of the liquid crystal display panel; and controlling a plurality of light emitting diodes, irradiating light to the liquid crystal display panel, in accordance with the control signal.

According to an aspect of the invention, the step of controlling the plurality of light emitting diodes includes: generating a pulse width modulation control signal, corresponding to the control signal generated from the timing controller, from a pulse width modulation controller included in a driver; and generating light from the light emitting diode in accordance with the control signal to irradiate the light to the liquid crystal display panel.

According to an aspect of the invention, the step of generating the pulse width modulation control signal includes changing at least one of an on-off duty ratio and an amplitude of the pulse width modulation control signal.

According to an aspect of the invention, the method further includes: setting any one of a duty ratio and an amplitude of the signal supplied from the light emitting diode in accordance with a reference brightness of the liquid crystal display panel during a scanning period before a picture implementing period of the liquid crystal display panel; and changing the amplitude and the duty ratio of the signal in accordance with any one of the set duty ratio and the set amplitude during the scanning period.

According to an aspect of the invention, there is an apparatus for driving a liquid crystal display device, the apparatus comprising: a liquid crystal display panel having at least two division areas; a light generator including at least one light emitting diode (LED) and irradiating light to each division area of the liquid crystal display panel; and a driver to control a brightness of the light emitted by the LED and irradiating to each division area, in accordance with a peak value of gray level of each division area.

According to an aspect of the invention, there is a liquid crystal display device comprising: a liquid crystal display panel; a backlight unit including a plurality of light emitting diodes (LEDs) to irradiating light to the liquid crystal display panel; and a driver to selectively drive the LEDs and selectively control a brightness of light generated by the LEDs.

According to an aspect of the invention, there is a method for driving a liquid crystal display device including a liquid crystal display panel and a light generator, the method comprising: dividing the liquid crystal display panel into at least two division areas; and controlling, in accordance with a peak value of gray level of each division area, the light generator including at least one light emitting diode (LED) to generate and irradiate light to each division area.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

Hereinafter, the preferred embodiments of the present invention will be described in detail with reference to FIGS. 3 to 11.

Figure 1:
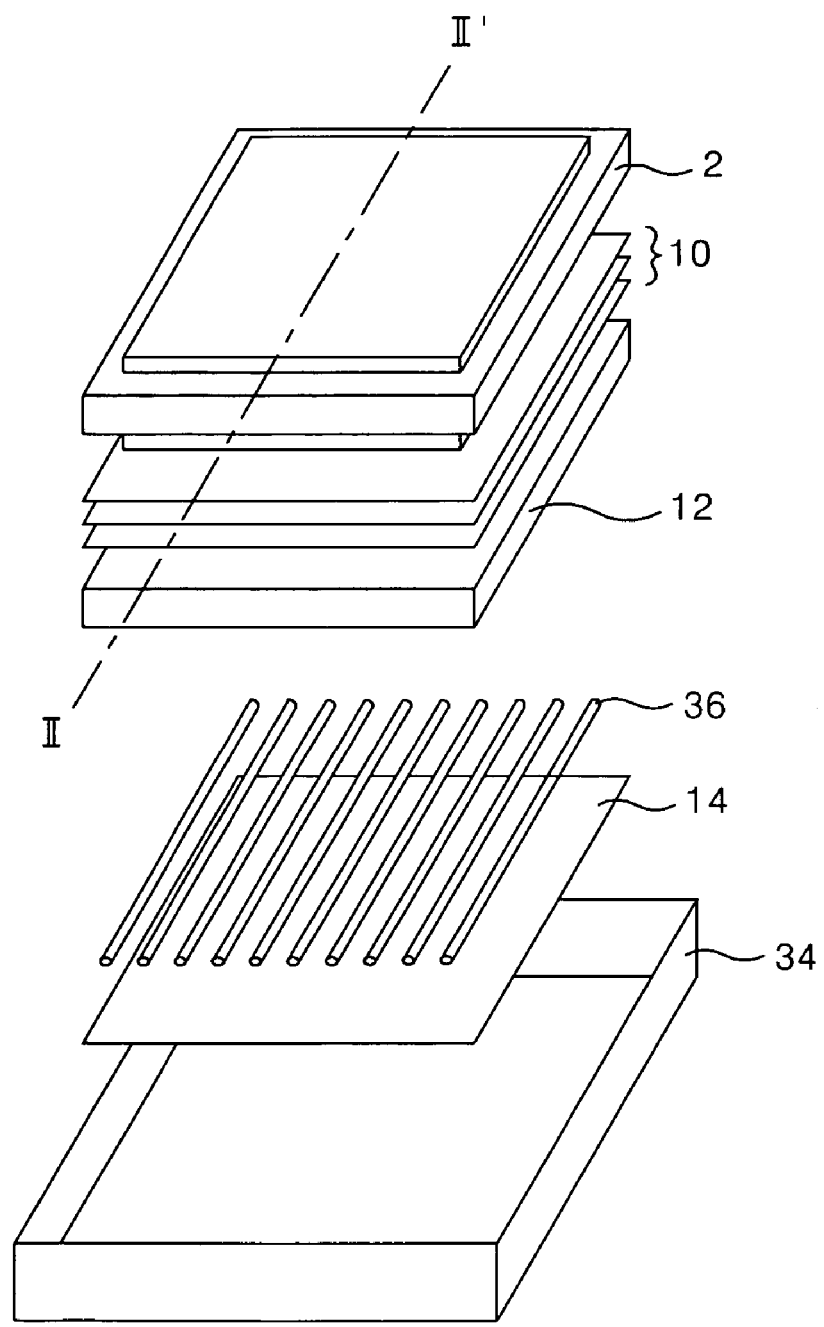
FIG. 1 is a perspective view illustrating a related art liquid crystal display device.
Figure 2:
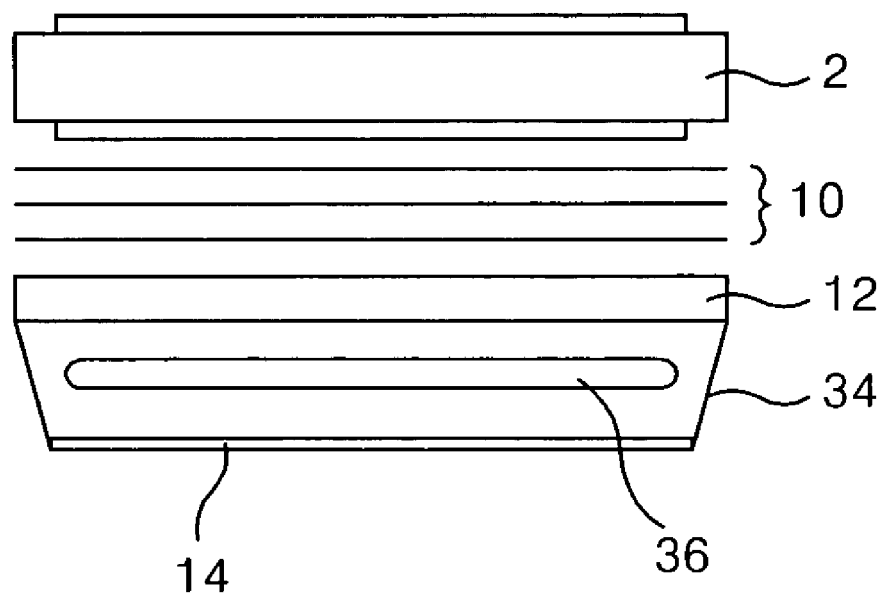
FIG. 2 is a sectional view illustrating the liquid crystal display device taken along the line II-II' in FIG. 1.
Figure 3:
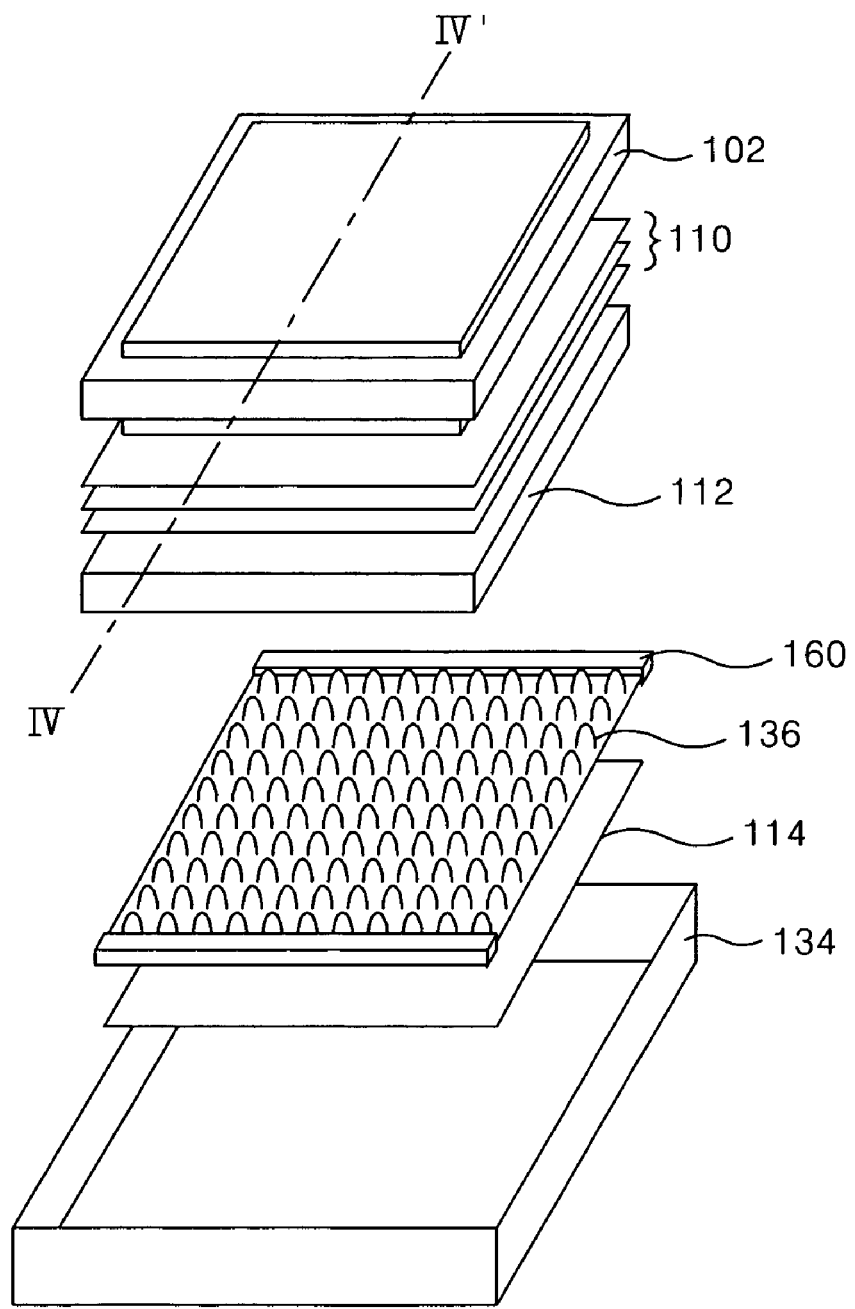
FIG. 3 is a perspective view illustrating a liquid crystal display device according to a first embodiment of the present invention.

FIG. 3 is a perspective view illustrating a liquid crystal display device according to a first embodiment of the present invention.

Figure 4:
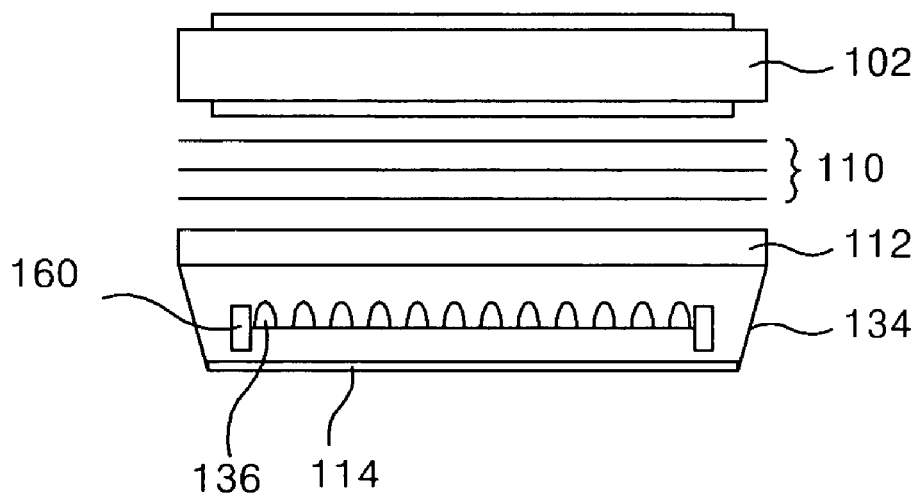
FIG. 4 is a sectional view illustrating the liquid crystal display panel taken along the line IV-IV' in FIG. 3.

Referring to FIGS. 3 and 4, a liquid crystal display device according to the first embodiment of the present invention includes: a liquid crystal display panel 102 to display a picture or image; a backlight unit having a plurality of white light emitting diodes LEDs 136 to irradiate a white light to each designated area of the liquid crystal display panel 102; and at least one LED driver 160 to drive each of the white LEDs 136. All the components of the liquid crystal display device are operatively coupled.

In the liquid crystal display panel 102, liquid crystal cells are arranged between an upper substrate and a lower substrate in a manner of an active matrix type, and a common electrode and pixel electrodes to apply electric field to each of the liquid crystal cells are provided. Generally, the pixel electrode is formed on the lower substrate, i.e., a thin film transistor substrate, for each liquid crystal cell. On the other hand, the common electrode is formed to be integrated with the front surface of the upper substrate. Each of the pixel electrodes is connected to a thin film transistor that is used as a switch device. The liquid crystal display panel may also include a color filter layer to provide red, blue and green color filters. The pixel electrode drives the liquid crystal cell along with the common electrode in accordance with a data signal supplied through the thin film transistor, thereby displaying a picture corresponding to a video signal.

The backlight unit includes a plurality of white lamp LEDs 136 to generate light; an LED housing 134 for housing the white LEDs 136; a diffusion plate 112 to diffuse the light generated from the LED housing 134; optical sheets 110 to increase the efficiency of the light coming out of the diffusion plate 112; and a reflection sheet 114 arranged on a rear surface of the white LEDs 136 to improve the efficiency of light and to prevent a light leakage.

Each of the LEDs 136 produces a minority carrier (an electron or a hole) injected by using a p-n junction structure and emits light by re-combining the electron and the hole. A material appropriate for the LED is a compound semiconductor such as gallium arsenide (GaAs), gallium phosphide (GaP), gallium-arsenic-phosphide (GaAs$_{1-x}$P$_x$), gallium-aluminum-arsenic (Ga$_{1-x}$Al$_x$As), indium phosphide (InP), or indium-gallium-phosphide (In$_{1-x}$Ga$_x$P), in which a light-emitting wavelength exists at visible area or an infrared light area, a light emitting efficiency is high and a manufacturing is capable by the p-n junction.

There exists an LED configured by re-combining free carriers and an LED configured by re-combining free carriers to which an impurity is added. The light-emitting wavelength of the LED configured by re-combining the free carriers is approximately ch/Eg, wherein, c represents a speed of light, h represents a Planck constant, and Eg represents an energy width of an energy gap. The LED using gallium arsenide emits an infrared light having about 900 nm wavelength. The LED using gallium-arsenic-phosphide emits visible lights since Eg is increased in accordance with the content of phosphorus (P).

Further, the wavelength of an LED configured by re-combining free carriers to which an impurity is added differs in accordance with a kind of impurities added to a semiconductor. In a case using gallium phosphide for the LED, an LED to which zinc and oxygen atoms are added generates a red color having a 700 nm wavelength, and an LED to which nitrogen atom is added generates a green color having a 550 nm wavelength. The LED has a smaller size and a longer life as compared to the lamp used in the related art LCD device. Further, the LED has a small power consumption and a high efficiency since its electrical energy is directly converted to a light energy.

Meanwhile, the LED has a high-speed response characteristic. Particularly, an injection semiconductor laser is a kind of LED having a high injection density and generates an inversion distribution, thus it is possible to cause a coherence light. Further, since a voltage of the LED is almost uniform, it is possible to adjust a brightness of the light generated by the LED by changing only the voltage at both ends of a series resistance connected to the LED and changing a proportion current to the changed voltage.

Among these LEDs, the white LEDs 136 are arranged in parallel for each designated area on the LED housing 134.

The LED housing 134 prevents the light leakage emitted from the white LEDs 136 and reflects the light, progressing to the inner side surface and the inner rear surface of the housing 134, to the front surface, i.e., toward the diffusion plate 112, thereby improving the efficiency of the light generated at the white lamps 136.

The diffusion plate 112 enables the light emitted from the white LEDs 136 to progress toward the liquid crystal display panel 102 and to be incident at an angle of a wide range. In this example, the diffusion plate 112 is a light diffusion member coated on both sides of a film which is composed of transparent resin.

The optical sheets 110 adjust or narrow the viewing angle of the light coming out of the diffusion plate 112, thus it is possible that the front brightness of the liquid crystal display device is improved and its power consumption is reduced.

The reflection sheet 114 is arranged between the white LEDs 136 and the bottom area of the LED housing 134 to reflect the light generated from the white LEDs 136 so as to irradiate it in the direction of the liquid crystal display panel 102, thereby improving the efficiency of light.

Figure 5:
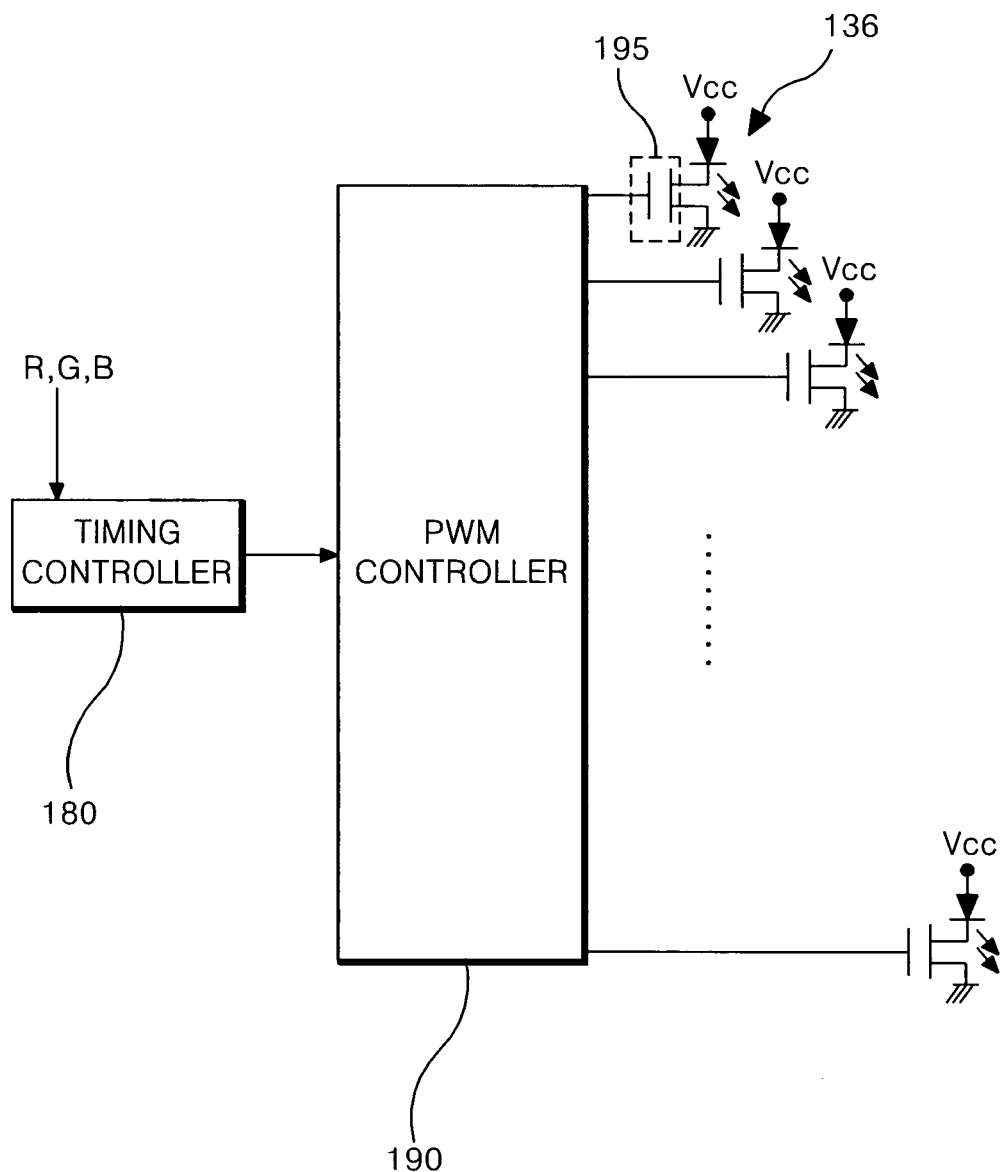
FIG. 5 is a block diagram showing an LED driver according to the first embodiment of the present invention.

The LED driver 160, as shown in FIG. 5, includes a pulse width modulation PWM controller 190 supplied with one or more control signals, corresponding to each video signal, from a timing controller 180 to supply the control signals to one or more white LED group, each white LED group formed by at least one white LED 136. Such an LED driver 160 further includes at least one switch 195 each arranged between the PWM controller 190 and each LED 136 in the white LED group to adjust a PWM (or pulse) signal applied to the corresponding LED.

The timing controller 180 generates the control signal in accordance with a character of a video signal to be applied to a predetermined area of the liquid crystal display panel 102. The video signals may be supplied by a video card (not shown) or some other source. More specifically, different pictures to be displayed on the liquid crystal display panel 102 have brightness and image data values different from each other. For instance, a bright image has a high brightness value and image data R,G,B in a bright gray level, whereas a dark image has a low brightness value and image data R,G,G in a dark gray level. In accordance with the above-mentioned characteristics, the timing controller 180 generates various control signals corresponding to different portions/areas of an image having various brightness values different from each other. That is, different control signals for different pixel units of the display panel are generated according to an image to be displayed on the display panel.

The PWM controller 190 receives the control signals different from each other according to the predetermined picture area from the timing controller 180 (directly or indirectly). Accordingly, the PWM controller 190 generates pulse signals each corresponding to one of the control signals supplied from the timing controller 180. Thereafter, the pulse signals corresponding to the control signals are applied to the white LED group 136 connected to the PWM controller 190.

Figure 6:
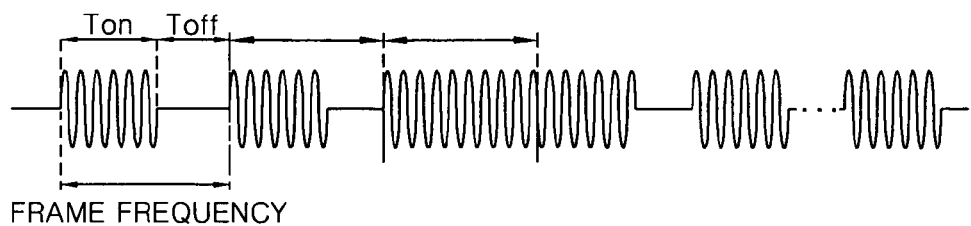
FIG. 6 is a first example of a waveform of a pulse signal generated from the driver.
Figure 7:
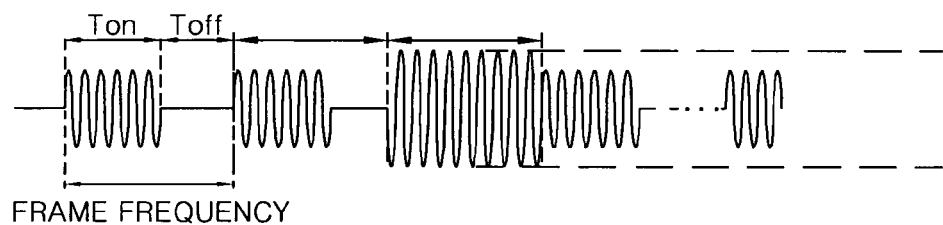
FIG. 7 is a second example of a waveform of a pulse signal generated from the driver.
Figure 8:
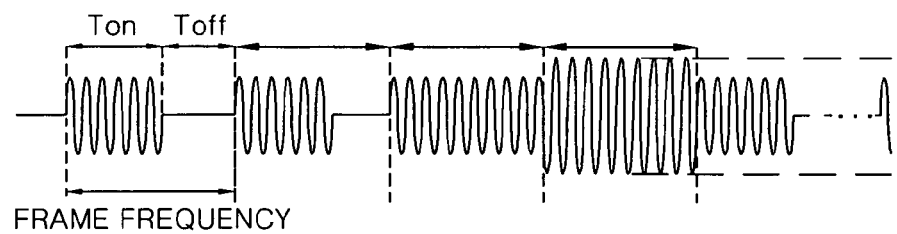
FIG. 8 is a third example of a waveform of a pulse signal generated from the driver.
Figure 9:
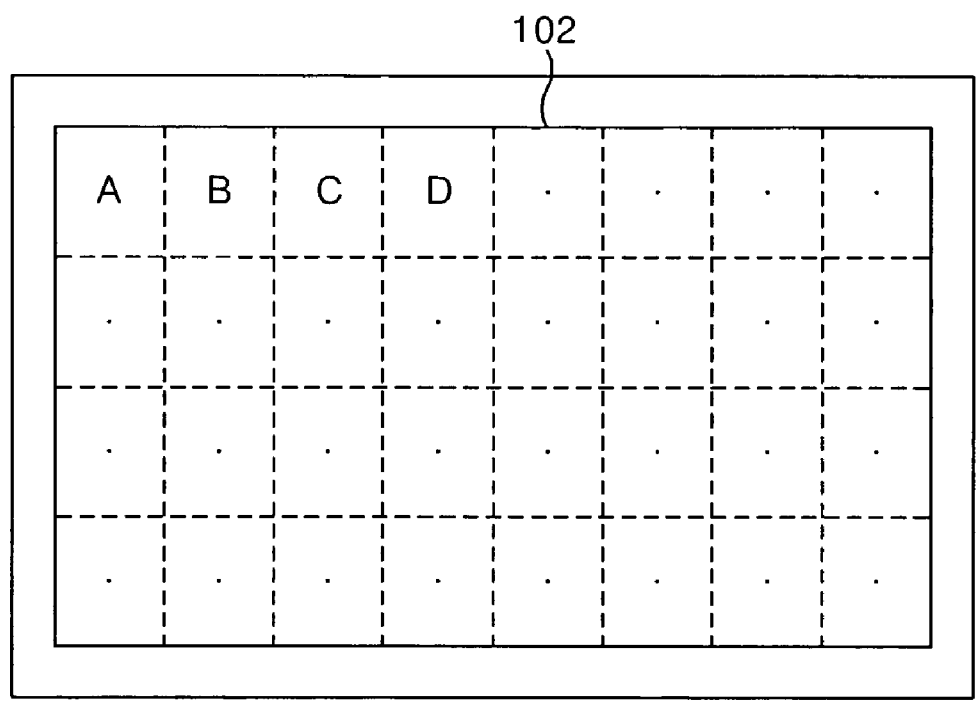
FIG. 9 is a configuration showing division areas of a liquid crystal display panel according to an embodiment of the present invention.

A generation of such a pulse signal by the PWM controller 190 will be described with reference to FIGS. 6 to 8. FIGS. 6-8 show different examples of a pulse signal and demonstrate different methods of generating a particular pulse signal corresponding to a particular control signal by modifying an initial base pulse signal generated in the PWM controller 190.

Firstly, a pulse signal corresponding to a control signal (supplied from the timing controller) can be generated by using one of the following methods: a method of adjusting an on-off duty ratio of a base pulse signal generated in the PWM controller 190 as shown in FIG. 6; a method of changing the amplitude of the initial pulse signal as shown in FIG. 7; and a method of adjusting the initial pulse signal in association with a duty rate and an amplitude modulation as shown in FIG. 8.

In order to display a picture on the liquid crystal display panel 102, a scanning process is used to compensate for a delay time required to activate a liquid crystal material. In this scanning process, the PWM controller 190 generates the pulse signal(s), corresponding to the brightness value provided from a user, by using the method of changing the on-off duty ratio and/or amplitude of the initial base pulse signal discussed above.

Thereafter, the pulse signal generated in this way is supplied during a scanning period to activate each white LED 136, so that the LED 136 irradiates light. Herein, the white LEDs 136 have a characteristic of a high-speed response about the pulse signal. Accordingly, the white LEDs 136 can reduce the delay of the liquid crystal material in a high-speed response as compared with the lamp used in the related art backlight unit of the LCD device.

A method for driving the liquid crystal display device having the above-mentioned structure will be described as follow.

As an example, a liquid crystal display panel in which the white LEDs 136 are divided into 32 different areas (A, B, C, D, . . . shown in FIG. 9) will be described with reference to FIGS. 3 to 9. In that example where the liquid crystal display panel 102 has the 32 areas, each of the 32 areas has a white LED group corresponding thereto to provide light onto that area. Each of such white LED groups is formed with one or more white LEDs 136. Accordingly, the PWM controller 190 has a structure which can selectively supply pulse signals different from each other to the white LED groups (136) corresponding to the 32 areas. Herein, although one PWM controller 190 is shown, the LED driver 160 can have one or more PWM controllers 190 each controller corresponding to each of the white LED groups. Such a PWM controller 190 receives a controller signal form the timing controller 180, wherein the control signal may correspond to each area among the 32 areas. Thereafter, the PWM controller 190 generates pulse signals different from each other, which correspond to the control signals different from each other supplied from the timing controller 180. In other words, by adjusting the on-off duty ratio and/or the amplitude of the base pulse signal, a pulse signal corresponding to the control signal supplied from the timing controller 180 is generated.

Such a pulse signal is supplied to the white LED group (136) and an image having variety brightness can be implemented in each of the 32 areas of the liquid crystal display panel 102 by the white LED group having variety brightness. For instance, the driver 160 (via a specific pulse signal) controls a brightness of the light, emitted from an LED and to be irradiated to each of the 32 divided areas of the display panel, in accordance with a peak value of gray level of a picture for each divided area. A picture can be implemented on an area requiring an instantly high brightness like an explosion or a flash in a high-speed response to an image requiring a moving picture and a brightness of a high contrast ratio.

Figure 10:
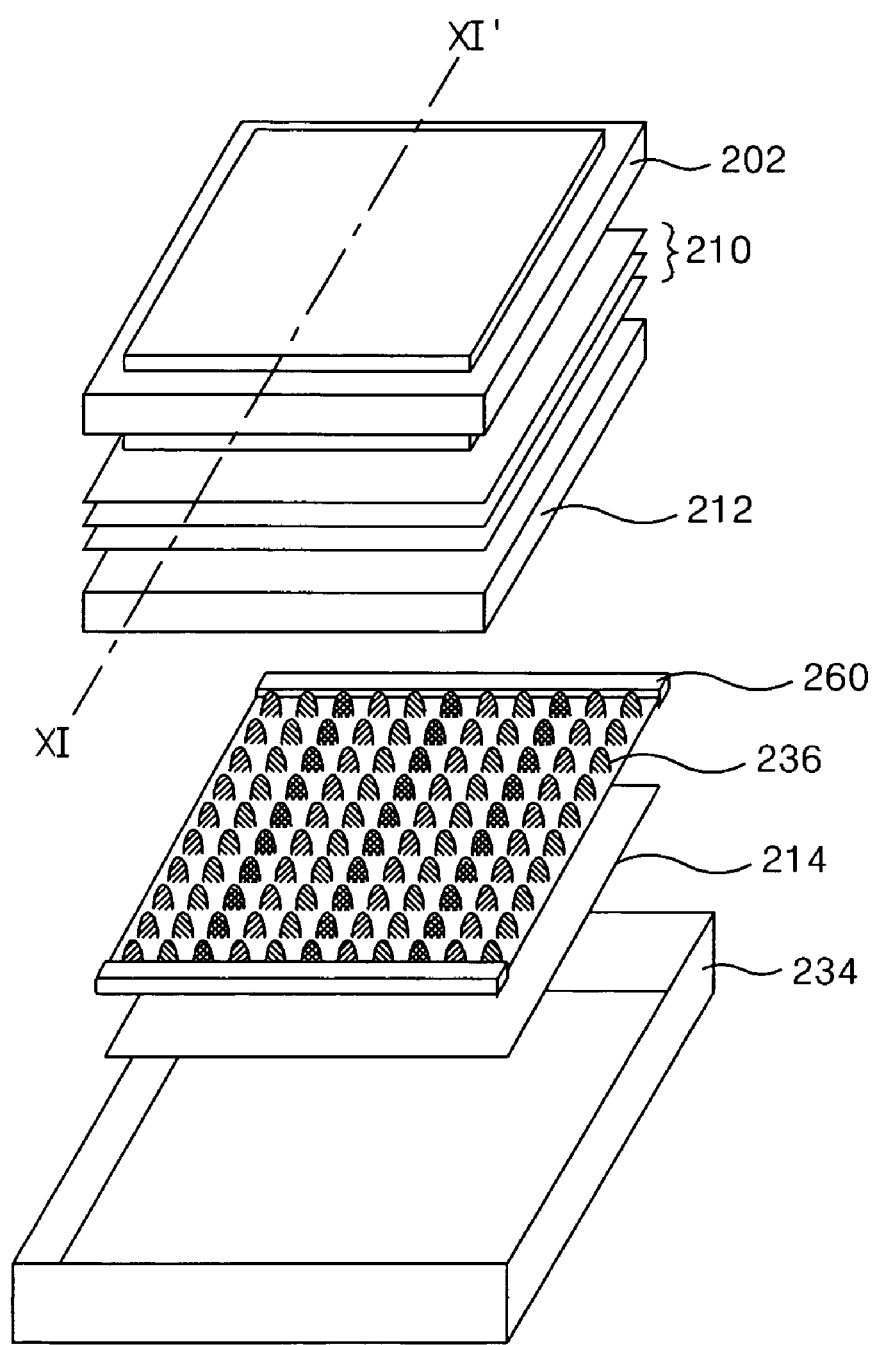
FIG. 10 is a perspective view illustrating a liquid crystal display device according to a second embodiment of the present invention.
Figure 11:
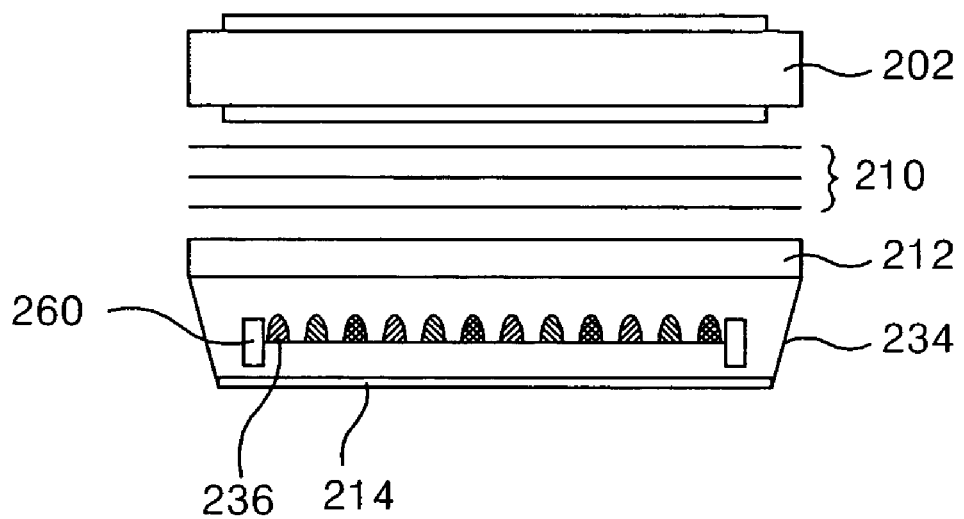
FIG. 11 is a sectional view illustrating the liquid crystal display device taken along the line XI-XI' in FIG. 10.

FIG. 10 is a perspective view illustrating a driving apparatus of a liquid crystal display device according to a second embodiment of the present invention.

The driving apparatus of the liquid crystal display device according to the second embodiment of the present invention includes: a liquid crystal display panel 202 to display a picture; a backlight unit having a plurality of red, green, and blue LEDs (RGB LEDs) 236 to irradiate light onto each designated area of the liquid crystal display panel 202; at least one LED driver 260 to drive each of the RGB LEDs 236. All the components of the liquid crystal display device including the driving apparatus are operatively coupled.

The structure and functions of the elements of the driving apparatus in the second embodiment of the present invention are identical to those of the first embodiment, except for the RGB LEDs 236 and the LED driver 260. Thus, the detailed description on the identical elements will be omitted for the sake of simple illustration and clarity.

The RGB LEDs 236 according to the second embodiment of the present invention can be arranged in different ways as needed. In an example, the RGB LEDs 236 include red LED, green LED, and blue LED alternatingly arranged in certain order at a regular ratio (R:G:B) and divide a predetermined area according to this arrangement. In another example, if an importance of green having a relatively high brightness is increased in the system or display device, then the RGB LEDs 236 are arranged in a ratio of R:G:G:B, i.e., in a sequence order of red LED, green LED, green LED, blue LED, red LED, green LED, green LED, blue LED, and so on.

The arrangement of the RGB LEDs 236 is arrayed for each designated area. Thus, the driving apparatus of the liquid crystal display device according to the second embodiment of the present invention divides a picture area of the liquid crystal display panel 202 and can selectively drive each of the divided areas by selectively driving one or more of the RGB LEDs 236.

The LED driver 260 includes: a timing controller 180 to generate control signals different from each other in accordance with image data; and a PWM controller 190 to generate pulse signals each corresponding to each control signal generated from the timing controller 180 as shown in FIG. 5.

The PWM controller 190 is installed to drive each LED 236 in accordance with the arrangement of the RGB LEDs 236. For instance, the PWM controller 190 is installed to control the RGB LEDs 236 by each LED (e.g., each LED can be selectively driven), to control the RGB LEDs 236 by a basic group type (e.g., if the LEDs 236 are arranged in R:G:B order, then the R, G and B LEDs as a basic group are selectively driven; or if the LEDs 236 are arranged in R:G:G:B order, then the R, G, G and B LEDs as a basic group are selectively driven; etc.), or to control the RGB LEDs 236 by a class having at least one RGB LED group.

A method of driving the liquid crystal display device having the above-mentioned structure according to the second embodiment of the present invention will be described as follows.

Firstly, the timing controller 180 generates a control signal in accordance with a brightness value of an image corresponding to a designated area of the liquid crystal display panel 202. The PWM controller 190 supplied with the control signal generates respectively a pulse signal being supplied to the RGB LED 236 in accordance with the control signal. In this manner, a plurality of pulse signals are generated and appropriately applied to selectively drive the LEDs 236. Herein, since the pulse signal corresponding to the control signal of the timing controller 180 is generated by the same method as the first embodiment, the description of the generation of the pulse signal is omitted. The LED 236 supplied with the pulse signal from the PWM controller 190 generates light, which is irradiated onto the liquid crystal display panel 202. In this connection, The LED 236 can irradiate specific visible rays to the liquid crystal display panel 202 in accordance with its characteristics. For instance, the driver 260 (via a specific pulse signal) controls a brightness of the light, emitted from an LED and to be irradiated to each of the 32 divided areas of the display panel, in accordance with a peak value of gray level of a picture for each divided area. Accordingly, the liquid crystal display device using the RGB LEDs 236 according to the second embodiment of the present invention can control partially a character of a color temperature and a color coordinate.

Meanwhile, since the white LEDs 136 and the RGB LEDs 236 in the present invention have a small size compared to a related art cold cathode florescent lamp (CCFL) and a related art external electrode florescent lamp (EEFL), the liquid crystal display panel 202 can be divided as needed. For instance, each of the 32 divided areas on the liquid crystal display panel 202 shown in FIG. 9 can be further divided into sub areas and the LEDs can be driven selectively to illuminate any one of the divided areas. Accordingly, the liquid crystal display device using the white LEDs 136 and the RGB LEDs 236 is possible to improve a picture quality and to reduce a blur phenomenon of a moving picture.

As describe above, the driving apparatus of the liquid crystal display device according to the embodiment of the present invention divides the liquid crystal display panel into at least two areas and can selectively drive the LED(s) corresponding to one or more of the divided area to display images. Accordingly, it is possible to control a partial brightness and to control partially a brightness control and a color temperature/color coordinate character in a case using the RGB LEDs. Moreover, since the LED has a characteristic of a high-speed response about current, it is easy to control the LED in an image displaying process compared to a tube type lamp used in the related art. In addition, since the LED is driven in a direct current, a circuit composition of the LED driver becomes simplified and an integration degree of the LED driver becomes high.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An apparatus for driving a liquid crystal display device, the apparatus comprising:
    a liquid crystal display panel having at least two division areas;
    a plurality of light generators including at least one light emitting diode (LED) and irradiating light corresponding to each division area of the liquid crystal display panel;
    a timing controller supplied with a peak value of gray level of the each division area to generate each control signal corresponding to the peak value of the gray level of the each division area; and
    a driver to control a brightness of the light emitted by the LED, in accordance with the each control signal,
    wherein the driver adjusts a duty ratio of a signal being supplied to the LED in accordance with a reference brightness of the liquid crystal display panel during a scanning period before a picture implementing period of the liquid crystal display panel, and changes an amplitude of the signal to correspond to the reference brightness, or
    adjusts the amplitude of the signal being supplied to the LED in accordance with the reference brightness of the liquid crystal display panel, and changes the duty ratio of the signal to correspond to the reference brightness.

2. The apparatus according to claim 1, wherein the at least one LED includes:
    at least one white LED; or
    red, green, and blue LEDs.

3. The apparatus according to claim 2, wherein the red, green, and blue LEDs include any one of the following: red-green-blue LEDs, red-green-green-blue LEDs, or red-green-blue-blue LEDs.

4. The apparatus according to claim 2, wherein the red, green and blue LEDs are arranged vertically and horizontally in certain order.

5. The apparatus according to claim 1, wherein the driver includes:
    a pulse width modulation (PWM) controller arranged between the timing controller and the LED; and
    a switch arranged between the PWM controller and the LED to control on-off of the LED.

6. The apparatus according to claim 5, wherein the PWM controller is connected to a light emitting diode group formed by at least one LED, to adjust a strength of current generated by the timing controller.

7. A liquid crystal display device comprising:
    a liquid crystal display panel;
    a backlight unit including a plurality of light emitting diodes (LEDs) irradiating light corresponding to the liquid crystal display panel;
    a timing controller supplied with a peak value of gray level of each division area to generate each control signal corresponding to the peak value of the gray level of the each division urea; and
    a driver to selectively drive the LEDs and selectively control a brightness of light generated by the LEDs in accordance with the each control signal,
    wherein the driver adjusts a duty ratio of a signal being supplied to the LED in accordance with a reference brightness of the liquid crystal display panel during a scanning period before a picture implementing period of the liquid crystal display panel, and changes an amplitude of the signal to correspond to the reference brightness, or
    adjusts the amplitude of the signal being supplied to the LED in accordance with the reference brightness of the liquid crystal display panel, and changes the duty ratio of the signal to correspond to the reference brightness.

8. The device according to claim 7, wherein the LEDs are one of the following:
    white LEDs; or
    a combination of red, green, and blue LEDs.

9. The device according to claim 7, wherein the LEDs are arranged in one of the following manners:

a sequence of red LED, green LED, green LED, and blue LED; or a sequence of red LED, green LED, blue LED, and blue LED.

10. The device according to claim 7, wherein the driver adjusts a duty ratio and/or an amplitude of a basic pulse signal to control the brightness of the light generated by one or more of the LEDs.

11. The device according to claim 7, wherein the plurality of LEDs are arranged in a matrix configuration.

12. A method for driving a liquid crystal display device including a liquid crystal display panel and light generators, the method comprising:

dividing the liquid crystal display panel into at least two division areas;

calculating a peak value of gray level of each division area;

generating a each control signal corresponding to each peak value; and controlling, in accordance with each control signal, the plurality of light generators including at least one light emitting diode (LED) to generate and irradiate light corresponding to the each division area, wherein the controlling step includes adjusting a duty ratio of a signal being supplied to the LED in accordance with a reference brightness of the liquid crystal display panel during a scanning period before a picture implementing period of the liquid crystal display panel, and changing an amplitude of the signal to correspond to the reference brightness, or adjusting the amplitude of the signal being supplied to the LED in accordance with the reference brightness of the liquid crystal display panel, and changing the duty ratio of the signal to correspond to the reference brightness.

13. The method according to claim 12, wherein in the controlling step, the at least one LED includes:

at least one white LED; or red, green, and blue LEDs arranged in certain order.

14. The method according to claim 13, wherein the red, green, and blue LEDs include any one of the following: red-green-blue LEDs, red-green-green-blue LEDs, or red-green-blue-blue LEDs.

15. The method according to claim 12, wherein the controlling step further includes:

generating a pulse signal according to the control signal; and selectively controlling the LED using the pulse signal.

16. The method according to claim 12, wherein the at least LED includes a plurality of LEDs arranged in a matrix configuration, and the controlling step includes:

dividing the plurality of LEDs into a plurality of LED groups; and selectively driving each of the LED groups.

\* \* \* \* \*